(12) United States Patent
Mateeva et al.

(10) Patent No.: US 12,130,395 B2
(45) Date of Patent: Oct. 29, 2024

(54) METHOD OF TIME-LAPSE MONITORING USING SEISMIC WAVES

(71) Applicant: SHELL OIL COMPANY, Houston, TX (US)

(72) Inventors: Albena Alexandrova Mateeva, Houston, TX (US); Paul Maarten Zwartjes, Rijswijk (NL)

(73) Assignee: Shell USA, INC., Houston, TX (US)

( * ) Notice: Subject to any disclaimer, the term of this patent is extended or adjusted under 35 U.S.C. 154(b) by 388 days.

(21) Appl. No.: 17/671,683

(22) Filed: Feb. 15, 2022

(65) Prior Publication Data

US 2022/0171084 A1 Jun. 2, 2022

Related U.S. Application Data

(63) Continuation of application No. 15/950,803, filed on Apr. 11, 2018, now Pat. No. 11,280,923, which is a
(Continued)

(30) Foreign Application Priority Data

Oct. 6, 2016 (EP) ..................................... 16192663

(51) Int. Cl.
*G01V 1/30* (2006.01)
*G01H 9/00* (2006.01)
(Continued)

(52) U.S. Cl.
CPC ............. *G01V 1/308* (2013.01); *G01H 9/004* (2013.01); *G01V 1/226* (2013.01); *G01V 1/40* (2013.01);
(Continued)

(58) Field of Classification Search
CPC .......... G01V 1/308; G01V 1/226; G01V 1/40; G01V 8/16; G01V 2210/6122; G01H 9/004
See application file for complete search history.

(56) References Cited

U.S. PATENT DOCUMENTS 4,312,040 A * 1/1982 Tinch ..................... G01V 11/00
702/6
5,966,672 A 10/1999 Knupp
(Continued)

FOREIGN PATENT DOCUMENTS

| CN | 1114511 A | 1/1996 |
|----|-----------|--------|
| CN | 102478670 A | 5/2012 |

(Continued)

OTHER PUBLICATIONS

International Search Report and Written Opinion received for PCT Patent Application No. PCT/US2017/055143, mailed on Jan. 19, 2019, 12 pages.
(Continued)

*Primary Examiner* — Krystine E Breier
(74) *Attorney, Agent, or Firm* — Shell USA, INC.

(57) ABSTRACT

Receiver-consistent scalars of seismic receiver channels are used for time-lapse monitoring of a sub-surface earth formation. Signals are induced by seismic waves propagating through the earth formation adjacent to each respective seismic receiver channel. Each seismic receiver channel is acoustically coupled to the earth formation as present directly adjacent to the location of the seismic receiver channel in question. The base receiver-consistent scalars and the monitor receiver-consistent scalars of seismic receiver channels can be outputted to reveal changes in these receiver-consistent scalars. These changes can be used to delineate information about physical changes in the subsur-
(Continued)

face earth formation. The changes in the based receiver-consistent scalars and the monitor receiver-consistent scalars may be displayed visually.

20 Claims, 7 Drawing Sheets

Related U.S. Application Data continuation of application No. PCT/US2017/055143, filed on Oct. 4, 2017.

(51) Int. Cl.
*G01V 1/22* (2006.01)
*G01V 1/40* (2006.01)
*G01V 8/16* (2006.01)

(52) U.S. Cl.
CPC ........ G01V 8/16 (2013.01); *G01V 2210/6122* (2013.01)

(56) References Cited

U.S. PATENT DOCUMENTS

| | | | |
|---|---|---|---|
| 6,574,563 B1* | 6/2003 | Nickel | G01V 1/28 702/14 |
| 7,577,061 B2* | 8/2009 | Williamson | G01V 1/30 367/38 |
| 8,332,154 B2* | 12/2012 | Chu | G01V 1/30 702/14 |
| 9,080,949 B2 | 7/2015 | Mestayer et al. | |
| 9,494,461 B2* | 11/2016 | Hornman | G01V 1/226 |
| 9,540,927 B2* | 1/2017 | Mann | E21B 47/04 |
| 10,386,516 B2* | 8/2019 | Willis | G01V 1/306 |
| 2006/0031017 A1* | 2/2006 | Mathieu | G01V 3/38 702/6 |
| 2006/0180349 A1 | 8/2006 | Dashevskiy | |
| 2006/0256657 A1* | 11/2006 | Robinson | G01V 1/40 367/38 |
| 2012/0092960 A1 | 4/2012 | Gaston et al. | |
| 2013/0279841 A1 | 10/2013 | Joinson | |
| 2013/0294720 A1 | 11/2013 | Koelman et al. | |
| 2014/0036628 A1* | 2/2014 | Hill | G01V 1/42 367/35 |
| 2014/0126325 A1 | 5/2014 | Farhadiroushan et al. | |
| 2014/0034538 A1 | 11/2014 | Boer et al. | |
| 2014/0345388 A1 | 11/2014 | Den Boer et al. | |
| 2016/0146960 A1* | 5/2016 | Steckhan | G01V 1/308 702/18 |
| 2018/0172860 A1* | 6/2018 | Wilson | G01V 1/50 |

FOREIGN PATENT DOCUMENTS

| | | |
|---|---|---|
| CN | 102483347 A | 5/2012 |
| CN | 103063253 A | 4/2013 |
| WO | 2016207341 A1 | 12/2016 |

OTHER PUBLICATIONS

Mateeva et al., "Distributed Acoustic Sensing for Reservoir Monitoring With Vertical Seismic Profiling", Geophysical Prospecting, vol. 62, Issue No. 4, May 23, 2014, pp. 679-692, XP055231175.
Taner et al., "Surface Consistent Corrections", Geophysics, Society of Exploration Geophysicists, vol. 46, Issue No. 1, Jan. 1, 1981, pp. 17-22, XP002670905.
Li et al., "Consistent Correction of Seismic Amplitude in Areas With Complicated Surface Conditions", Chinese Journal of Geophysics, Nov. 1, 2002, pp. 903-911, XP055355284.
Mateeva et al., "Advances in Distributed Acoustic Sensing (DAS) for VSP", SEG Annual Meeting, Jan. 1, 2012, pp. 1-5, XP007921905.
Zwartjes et al., "Multi-Fibre DAS Walk-Away VSP at Kapuni", Third EAGE Workshop on Borehole Geophysics Athens, Apr. 19-22, 2015, 5 pages.
Zwartjes et al., Abstract 77th EAGE Conference Madrid Jun. 1-4, 2015, 4 pages.
International Search Report and Written Opinion received for PCT Patent Application No. PCT/EP2016/064654, mailed on Dec. 2, 2016, 11 pages.
Linari, "A Practical Approach to Well-seismic Data Calibration", the Leading Edge, vol. 23, Issue No. 8, Aug. 1, 2004, pp. 774-775, XP055233888.
Li et al., "Consistent Correction of Seismic Amplitude in Areas With Complicated Surface Conditions", Chinese Journal of Geophysics, vol. 45, Issue No. 6, Nov. 30, 2002, pp. 903-911.
Yanliang et al., "Marine High Resolution Multi-channel Digital Seismic Streamer and Its Application in the Ocean Engineering", Progress in Geophysics, vol. 28, Issue No. 6, Dec. 31, 2013, pp. 3280-3286.

* cited by examiner

METHOD OF TIME-LAPSE MONITORING USING SEISMIC WAVES

CROSS REFERENCE TO RELATED APPLICATIONS

This is a Continuation Application of U.S. Ser. No. 15/950,803, filed 11 Apr. 2018, which is a Continuation Application of PCT/US2017/055143, filed 4 Oct. 2017, which benefits priority of European application No. 16192663.9, filed 6 Oct. 2016, all of which applications are incorporated herein by reference.

FIELD OF THE INVENTION

In accordance with a first aspect of the present invention, there is provided a method of time-lapse monitoring of a subsurface earth formation.

BACKGROUND OF THE INVENTION

Various seismic techniques have been developed which employ a seismic receiver spread disposed in a borehole in an earth formation. Examples include tomographic techniques (such as include cross-borehole seismic tomography), and Vertical Seismic Profiling (VSP).

Distributed Acoustic Sensing (DAS) is a useful novel technology to provide such a seismic receiver spread in a borehole in an earth formation for seismic data acquisition purposes. A description of this technology is provided in an article "Distributed acoustic sensing for reservoir monitoring with vertical seismic profiling" by Albena Mateeva et al., which appeared in *Geophysical Prospecting*, Vol. 62, pp. 679-692 (2014). Conceptually, DAS measurements are simple. A DAS interrogator unit sends laser pulses along an optical fiber disposed in a wellbore, and measures signals of back-scattered light. The optical fiber can be subdivided into DAS receiver channels (corresponding, for instance, to VSP receiver levels) based on the time of flight of a laser pulse along it.

DAS also has been proposed for time-lapse monitoring, particularly time-lapse VSP. In the context of VSP, a time-lapse surveying is also known as 4D surveying. However, 4D VSP is far from easy. Not only are high level of repeatability and high signal quality (particularly high signal-to-noise ratio) required, which makes 4D acquisition technically challenging, but also the positioning of detected 4D changes in the formation requires significant effort in both acquisition and processing, especially away from the VSP well(s). These difficulties exist irrespective of whether the VSP is based on DAS or conventional receivers such as hydrophones/geophones.

SUMMARY OF THE INVENTION

In a first aspect there is provided a method of time-lapse monitoring of a subsurface earth formation, comprising:
selecting a seismic receiver spread disposed in a borehole in an earth formation, wherein said seismic receiver spread comprises a plurality of seismic receiver channels each seismic receiver channel having a seismic receiver channel location, whereby each seismic receiver channel is acoustically coupled to the earth formation that is present adjacent to the seismic receiver channel location;
collecting base survey data, comprising measuring base survey signals in the seismic receiver spread induced by seismic waves propagating through the earth formation;
determining base receiver-consistent scalars for the seismic receiver channels from the base survey data;
allowing a time lapse between said collecting of base survey data and collecting of monitor survey data;
after said time lapse, collecting the monitoring survey data, comprising measuring monitor survey signals in the seismic receiver spread induced by seismic waves propagating through the earth formation;
determining monitor receiver-consistent scalars for the seismic receiver channels from the monitor survey data;
outputting base and monitor receiver-consistent scalars to reveal changes in the receiver-consistent scalars before and after the time lapse.

Each said receiver-consistent scalar is a measure of signal strength (amplitude) induced by seismic waves propagating through the earth formation adjacent to each respective seismic receiver channel. The base and monitor receiver-consistent scalars suitably quantify signal amplitude.

The changes in the receiver-consistent scalars may be used to delineate information about changes in the subsurface. Amongst changes in the subsurface that can be delineated are changes in the earth formation that is present adjacent to the seismic receiver channel locations (for instance, changes in elastic properties of the formation), and changes in relative positions between rock layers in the subsurface earth formation and the seismic receiver channels that have occurred during the time lapse, for example due to well completion deformations or due to subsidence.

Alternative, or in addition, to using the changes in the receiver-consistent scalars to delineate information about changes in the subsurface, the changes in receiver-consistent scalars at one or more of the seismic receiver channels may be used for depth-matching of the base and monitor survey data. Subsequent to such depth-matching, information about changes in the subsurface may be delineated from the changes in the receiver-consistent scalars. In addition, or instead thereof, more generally the base and monitor survey data (depth-matched or not) may be used in any suitable 4D analysis method.

BRIEF DESCRIPTION OF THE DRAWING

The appended drawing, which is non-limiting, comprises the following figures.

FIG. 6 shows a graph of depth shift (plotted on a linear scale) between base and monitor survey data for each depth-matched DAS receiver channel of FIG. 5a.

Figure 1:
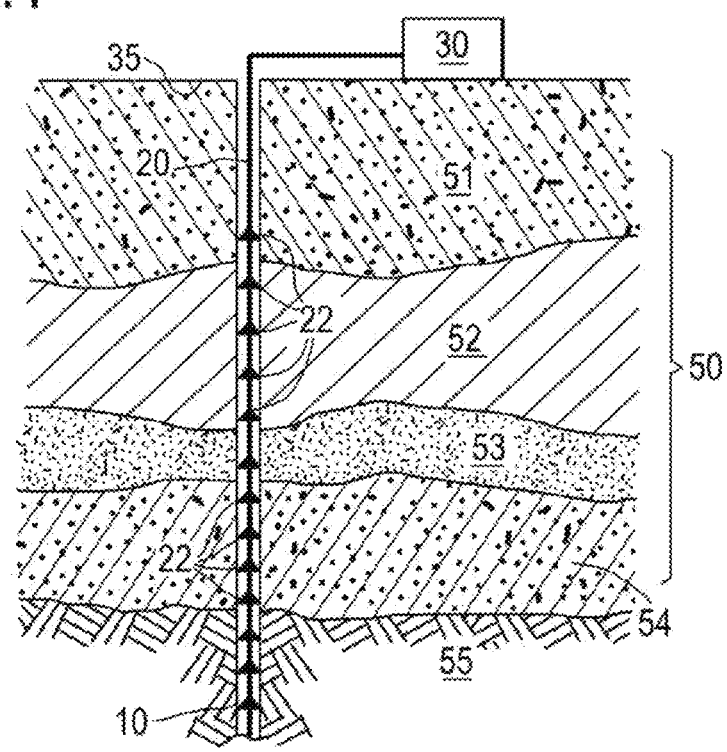
FIG. 1 shows a schematic longitudinal section of a borehole in an earth formation.

Scalars and depth scales are consistently plotted on linear scales. The spacing between successive tick marks in FIGS. 5a, 5b, and 7 corresponds to 610-m depth intervals (2000 ft) in the channel depth. Scalars are plotted in arbitrary units.

DETAILED DESCRIPTION OF THE INVENTION

The invention will be further illustrated hereinafter by way of example only, and with reference to the non-limiting drawings. The person skilled in the art will readily understand that, while the invention is illustrated making reference to one or more a specific combinations of features and measures, many of those features and measures are functionally independent from other features and measures such that they can be equally or similarly applied independently in other embodiments or combinations.

A method is presently proposed wherein receiver-consistent scalars of seismic receiver channels, which are a measure of signal strength, are used for time-lapse monitoring of a sub-surface earth formation. The signals are induced by seismic waves propagating through the earth formation adjacent to each respective seismic receiver channel. The seismic receiver channels, together, are configured to form a seismic receiver spread disposed in a borehole in the earth formation. Each seismic receiver channel is acoustically coupled to the earth formation as present directly adjacent to the location of the seismic receiver channel in question. The base receiver-consistent scalars and the monitor receiver-consistent scalars of seismic receiver channels can be outputted to reveal changes in these receiver-consistent scalars. These changes can be used to delineate information about physical changes in the subsurface. The changes in the based receiver-consistent scalars and the monitor receiver-consistent scalars may be displayed visually.

Receiver-consistent scalars are a convenient measure of signal strength (amplitude) of signals induced in the receiver by seismic waves propagating through the earth formation. Receiver-consistent scalars are numbers that quantify signal amplitude. Receiver-consistent scalars quantify signal amplitude but are not necessarily linearly proportional to the amplitude. For instance, the receiver-consistent scalar value may suitably correspond to the inverse root-mean-square average signal amplitude of signals of a collection of events recorded in the receiver.

The local strain in the formation material as caused by a pressure field (which, in turn, is associated with seismic waves that propagate through the earth formation), is inversely proportional to local formation density (at the location of the strain) times the square of the local seismic p-wave velocity. Therefore, DAS channel-consistent scalars, which conveniently are inversely proportional to strain, are proportional to density and seismic p-wave velocity squared. For geophones, on the other hand, the receiver-consistent scalars turn out to be proportional to density and seismic velocity. DAS receiver channels are thus more sensitive to time-lapse changes in seismic velocity than geophones.

Either way, the receiver-consistent scalar is a useful representation of a "formation-material-dependent response" of which the strength is directly affected by the elastic properties of the formation material of the earth formation to which the seismic receiver channel (by which the seismic wave is sensed) is locally coupled. This is the formation material of the earth formation that is adjacent to the position of the seismic receiver channel.

An advantage of employing receiver-consistent scalars for time-lapse monitoring of subsurface earth formation is that such receiver-consistent scalars at each receiver channel can be readily compared to each other without the need for complex data-inversion methodologies. The interpretation of time-lapse differences provides direct information about the changes in the formation layer to which the seismic receiver channel is coupled, such as changes in formation density or seismic wave velocity over time. Alternatively, movement of formation boundaries over time relative to the receiver channels in the seismic receiver spread as disposed in a borehole in the earth formation can be monitored by interpreting the movement of sharp transitions of the receiver-consistent scalars between neighbouring seismic receiver channels.

For the proposed time-lapse monitoring of a subsurface earth formation using receiver-consistent scalars, a seismic receiver spread is preferably permanently installed in the borehole. The term "permanently" in this context is taken to mean at least during the duration of the time lapse between measuring of the base survey signals for determining the base receiver-consistent scalars and measuring of the monitor survey signals for determining the monitor receiver-consistent scalars.

In the description and claims, the term "time lapse" is generally used to identify a length of time that is purposely selected sufficiently long for changes to occur in the sub-surface earth formation that are significant enough to be measurable. This is typically longer than a full day (i.e. 24 hours), and usually much longer than a full day, such as longer than a week (i.e. seven full days), longer than a month (i.e. 30.44 full days), or even longer than one year (i.e. 365.25 full days). The term time lapse as used herein is not used for relatively short time spans in the course of which seismic measurements are repeated with the aim to collect more signal to improve the signal-to-noise ratio. Such relatively short time spans are purposely selected short enough whereby there are no significant changes in the subsurface.

In the context of the present disclosure, the term "depth" is generally understood to mean measured depth (MD) unless otherwise specified. MD, which in the context of DAS seismic receiver channels may also be referred to as channel measured depth, is a term of art used to denote measured length along the trajectory or path of the borehole. This measurement differs from the true vertical depth (TVD) of the borehole in all but vertical boreholes. However, sometimes it is convenient to convert MD to TVD or vice versa. Such conversion is possible if the trajectory of the borehole is known. Such conversion may be convenient for instance to tie seismic channel depths to a seismic velocity model. It is not essential what point is defined as zero depth. For convenience it is proposed to define the top end of the borehole at the earth's surface as zero depth.

In the broadest sense, the term "a number of" means one or more. In specific embodiments, the term "a number of" may mean a plurality of, or, two or more.

Suitably, the receiver-consistent responses may be expressed in the form of channel-consistent amplitude scalars, as may be determined using a channel-consistent scalar derivation technique known in the art. A channel-consistent scalar, as understood by those skilled in the art, is a single numerical value which characterizes the response of a specific channel as configured within its local environment coupled to the earth formation, by removing contributions or effects of other circumstances that can affect a factual response, such as differences in seismic source signatures, or differences in locations of the seismic sources, etc. The concept of consistency in seismic detection is well known to those of skill in the art and adequately explained in, for instance, a landmark paper by M T Taner and F Koehler, titled "Surface consistent corrections" published in Geophysics Vol 46 No. 1 (1981) pp. 17-22. Receiver-consistency and/or channel-consistency as introduced in the present description and claims are considered to be physical analogues to surface-consistency, applicable when the receiver channels are disposed in a borehole in the earth formation rather than on the earth surface.

In surface seismic acquisition, the term "receiver-consistent response" is understood to describe the effects the near-surface in the immediate vicinity of a seismic receiver has on seismic traces recorded in that seismic receiver. Similarly, in vertical seismic profiling (VSP), the receiver-consistent response describes the effects of the medium immediately surrounding each downhole receiver. The simplest description of those effects can be reduced to a scalar, which is the receiver-consistent scalar. A receiver in which seismic records tend to have a relatively high amplitude compared to other receivers is assigned a relatively small receiver-consistent scalar, and conversely dim receivers, which tend to have relatively low signal amplitudes are assigned a relatively high receiver-consistent scalar. The traditional purpose of these receiver-consistent scalars is to bring the seismic traces from the various receivers to a common (usually, average) amplitude level. Methods of calculating receiver-consistent scalars are well known in the art and need not be further explained. The specific choice of method is inconsequential to the present invention.

The method described herein can be employed for any type of seismic receiver spread, including arrays of geophones and DAS optical fibers. However, for the sake of conciseness the remainder of the description will be made taking DAS optical fibers as example. Main advantages of DAS optical fibers are that the coverage is usually larger than with geophones and/or the seismic receiver channel spacing can be lower (i.e. a higher number of seismic receiver channels per unit length). Both these factors make it easier to interpret the time-lapse differences in receiver channel-consistent scalars. The person skilled in the art will nonetheless be able to apply the same principles to other types of seismic receiver spreads.

Referring now to FIG. 1, there is shown a schematic longitudinal section of a borehole 10 in an earth formation 50. The borehole 10 traverses through a number of geological layers (schematically indicated by areas 51 to 55), each having its own properties, including elastic properties. A DAS optical fiber 20 is disposed in the borehole 10. The (DAS) optical fiber 20 is subdivided in a plurality of DAS receiver channels 22. Only a few of these DAS receiver channels 22 are depicted in FIG. 1 in the interest of visual clarity. In reality, hundreds of DAS receiver channels, with a receiver channel spacing of between 2 m and 10 m, are not uncommon.

Each seismic receiver channel 22 is associated with a certain depth in the earth formation, and each seismic receiver channel 22 is locally coupled to the earth formation 50 that is present adjacent to the location of the seismic receiver channel 22 in question. This can be done by cementing the DAS cable behind well casing, for example. For the avoidance of doubt, in the context of the present disclosure a seismic receiver channel is locally coupled to the earth formation that is present adjacent to the location of the seismic receiver channel in question if there is a physical path of contact between the location of the seismic receiver channel and said earth formation within a plane that is transverse to the longitudinal direction of the borehole between the seismic receiver channel and the earth formation, either directly or through intermediate materials which could include cement and/or well tubulars such as casing.

An interrogator unit 30 is configured on the earth's surface 35. The interrogator unit 30 is connected to the DAS optical fiber 20 and arranged to transmit optical laser pulses into the DAS optical fiber 20 and detect back scattered optical signals which are influenced by deformations along the optical fiber, which may be caused by impinging seismic waves. Since any part of the optical fiber can be deformed and interrogated for seismic information this type of measurement is called distributed acoustic sensing. The location of any deformation may be determined from the known time of flight of the optical laser pulse that sensed it. Thus, the DAS optical fiber 20 can be subdivided into the DAS receiver channels 22 (corresponding to VSP receiver levels, for instance) based on the time of flight of the optical laser pulse along it.

Figure 2:
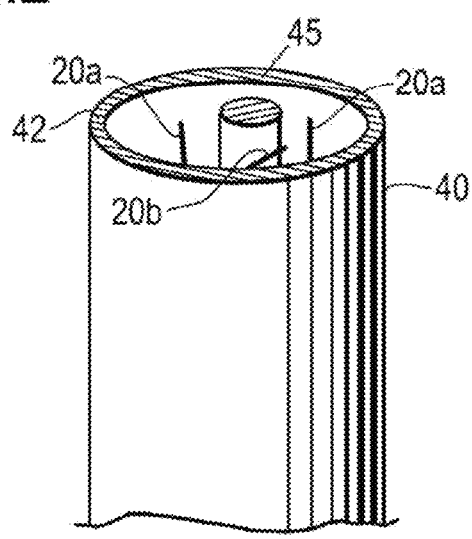
FIG. 2 shows a schematic view of a DAS cable.

Suitably, the DAS optical fiber 20 is packaged in a DAS cable 40. A schematic view of an example is shown in FIG. 2. The DAS cable may comprise a plurality of DAS optical fibers, which when used simultaneously can enhance the signal to noise ratio. Two straight longitudinal optical fibers 20a are shown in FIG. 2 as an example, but more may be provided such as five. Alternatively, or in addition thereto, one or more helically wound optical fibers 20b may be configured in the DAS cable 40. Suitably, these helically wound optical fibers 20b may be wound around a core 45. Everything may be embedded in protective materials, and covered by one or more protective out layers. One protective outer layer 42 is shown as an example. Unlike straight longitudinal optical fibers 20a, cables comprising helically wound optical fibers 20b are sensitive to broadside p-waves (p-waves with a propagation component within a plane extending perpendicular to the longitudinal direction of the cable at the intersection of the cable with the plane). Such helically wound cable and other examples of fiber-optic cables with broadside sensitivity to seismic waves are disclosed in U.S. Pat. No. 9,080,949 and US pre-grant publication No. 2014/0345388.

Figure 3:
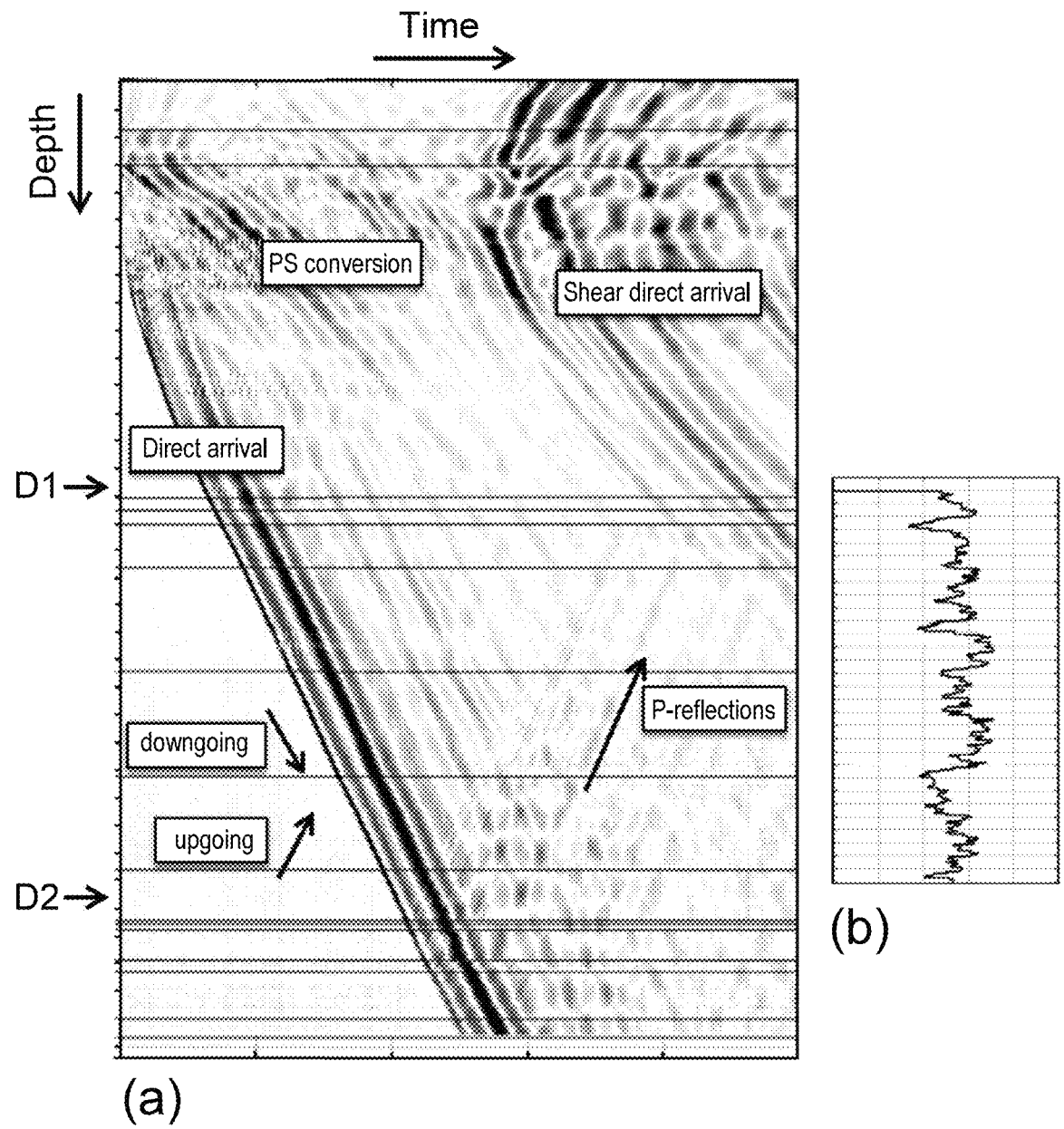
FIG. 3 (part a) shows a near-offset VSP data measured using a DAS cable in a borehole, and (part b) shows corresponding DAS channel-consistent scalars derived from the measurements in a depth interval D1 to D2.

FIG. 3, part 3a, shows seismic traces of a near-offset VSP gather acquired by using DAS simultaneously on five optical fibers deployed in a borehole. The five optical fibers may be configured in a single DAS cable. The response times are plotted on a horizontal and the DAS receiver channels are plotted along a vertical axis, using assumed depths on a TVD scale. Two depth levels (D1 and D2) are indicated for reference. The (downgoing) direct arrival can be seen on the left and upgoing waves due to reflections on geological interfaces are visible as well.

FIG. 3b shows channel-consistent scalars in a depth interval between D1 and D2. Channel-consistent scalars (in the present case: DAS channel-consistent scalars) were derived from the DAS VSP data, in a manner analogous to surface-consistent scalar derivation for surface seismic data (reference is made, again, to the paper by Taner and Koehler). The channel-consistent scalars are inversely proportional to the average signal amplitude in each seismic receiver channel.

Suitably, the value of signal amplitude is determined relative to a reference signal amplitude for each seismic receiver channel. Suitably, the receiver-consistent scalar value is inversely-proportional to a root-mean-square (RMS) average amplitude of a plurality of coherent seismic events, such as all the signals corresponding to upgoing waves seen in FIG. 3a. Suitably, multiple gathers are considered such as multiple gathers taken with mutually differing source-receiver offsets, to derive the DAS channel-consistent scalar. Walk-away VSP shot gathers are an example of suitable multiple gathers. The so derived channel-consistent scalars constitute a convenient measure of signal strength.

A channel-consistent scalar of signals recorded by each seismic receiver channel 22 as induced by seismic waves propagating through the earth formation 50 may thus be determined using actual measurements of signals of back-scattered light from the DAS optical fiber 20. The channel-consistent scalars shown in FIG. 3b are DAS channel-consistent scalars derived from seismic traces from a 2D walk-away VSP survey with dynamite sources.

Figure 4:
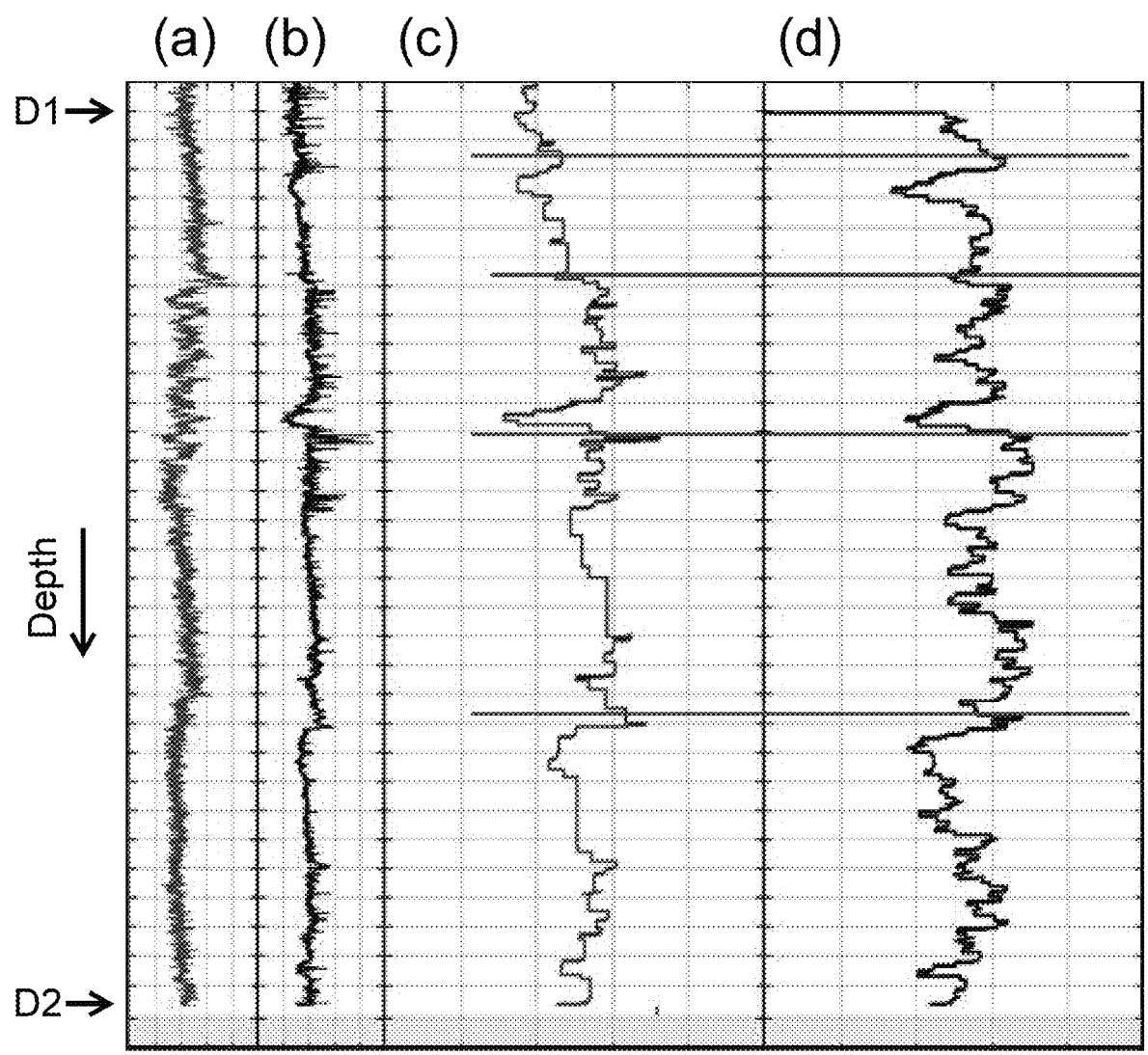
FIG. 4 shows a comparison of a gamma ray log (4a), a sonic log (4b), a blocked sonic log (4c), and DAS channel-consistent scalars (4d) from FIG. 3b.

FIG. 4 illustrates that the channel-consistent scalars are suitable to qualitatively provide direct information about the formation properties adjacent to the seismic receiver channels 22. The DAS channel-consistent scalars from FIG. 3b are reproduced in FIG. 4d, on a linear scale against depth. (Depth is plotted as MID.) Only data between D1 and D2 are considered. For easy comparison, a gamma ray log from the same borehole is shown in FIG. 4a, and a sonic log in FIG. 4b. FIG. 4c corresponds to the sonic log of FIG. 4b, after upscaling. Upscaling is done to facilitate comparing the sonic log, which has a much finer sampling, with the receiver-consistent scalars of the DAS receiver channels.

As can be seen by comparing FIG. 4c with FIG. 4d, a remarkable correlation is found between the DAS channel-consistent scalars of FIG. 4d with the upscaled sonic log of FIG. 4c. The correlation can be observed on the basis of the unblocked data of FIG. 4b as well, but the similarity is more strikingly observed in FIG. 4c. There is also a correlation between the gamma ray log of FIG. 4a and the DAS channel-consistent scalars of FIG. 4d, but in the present example this is a much weaker correlation. This is another indication that the channel-consistent scalars are a measure of elastic properties of the formation. The gamma ray log is only indirectly related to the elastic properties of the earth formation, and thus the correlation with the channel-consistent scalars is weaker.

As there is the remarkable correlation between the receiver-consistent scalars and certain well logs, the receiver-consistent scalars corresponding to a certain vintage of seismic survey may also be compared directly to certain well logs of a different vintage. This could be used as a preliminary study of relative movement of rocks and strata and/or receiver cable, even if only one vintage of seismic survey data is available or if there is no seismic survey data contemporary to the well log(s). In such a case, the well log(s) could take the place of the base survey scalars (or the monitor survey scalars).

EXAMPLE

Figure 5A:
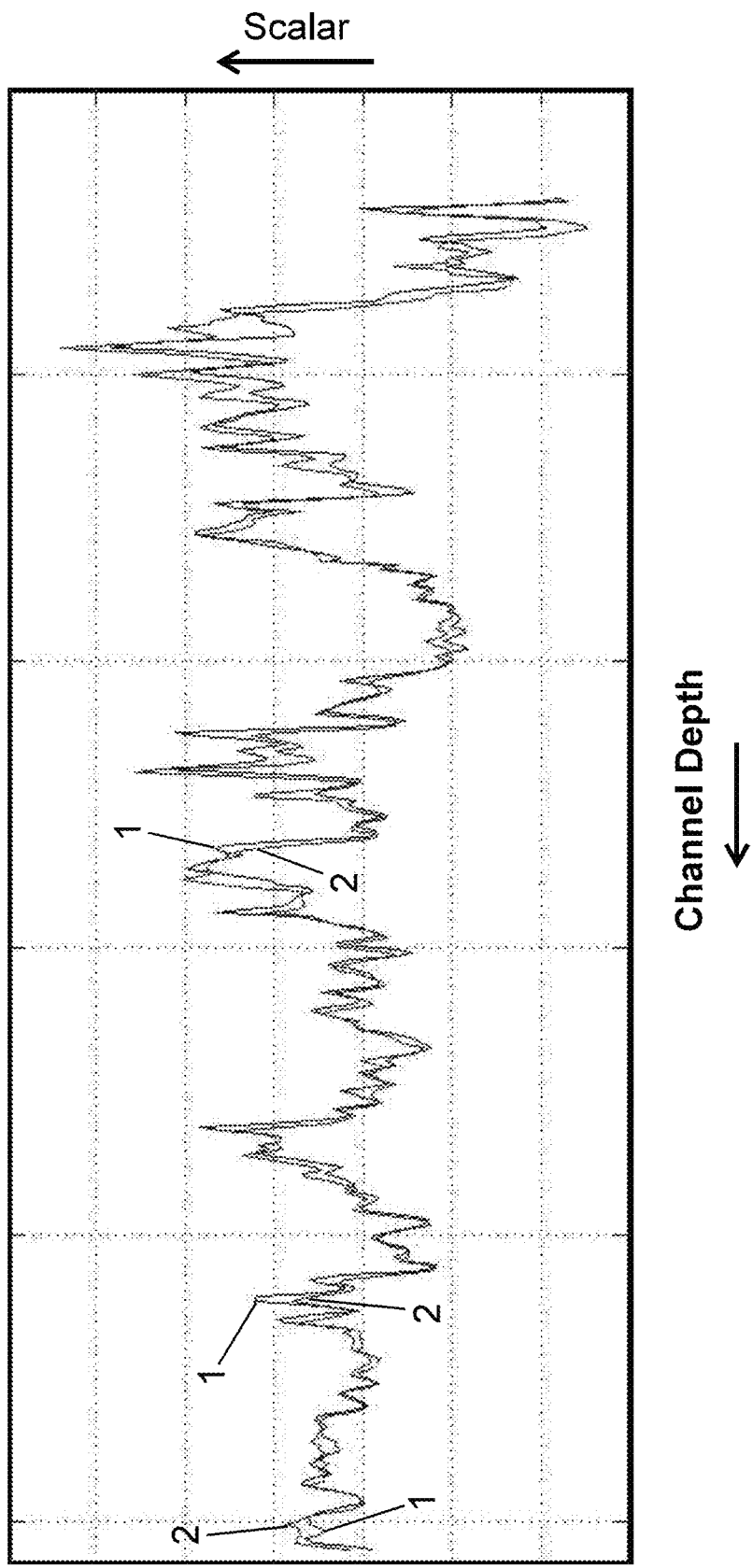
FIG. 5a shows DAS channel-consistent scalars, as a function of depth, of a base survey and monitor survey of two different vintages in a single graph.

A time lapse seismic survey was performed using a DAS cable configured in a borehole in the earth. FIG. 5a shows DAS channel-consistent scalars, as a function of channel depth (channel measured depth), of a base survey (represented by line 1) and a monitor survey (represented by line 2) collected three years after the base survey, and outputted in a single graph. The output reveals changes in the DAS receiver-consistent scalars before and after the three-year time lapse. Careful comparison shows small movements in the depth-axis, in addition to local changes in magnitude of scalars. These changes can be used to delineate information about physical changes in the subsurface.

For instance, the monitor DAS receiver-consistent scalars may be depth-matched with the base DAS receiver-consistent scalars. This may be done using so-called sliding window techniques whereby a depth shift for the monitor receiver scalars within each given sliding window position in depth is extracted whereby the base and monitor data correlate best. The finally resulting set of depth shifts obtained from different positions of the sliding window in depth can be outputted, and important information can be delineated about relative movement that has occurred during the time lapse between the seismic receiver channels on one hand, and rock layers in the subsurface earth formation on the other hand.

Figure 6:
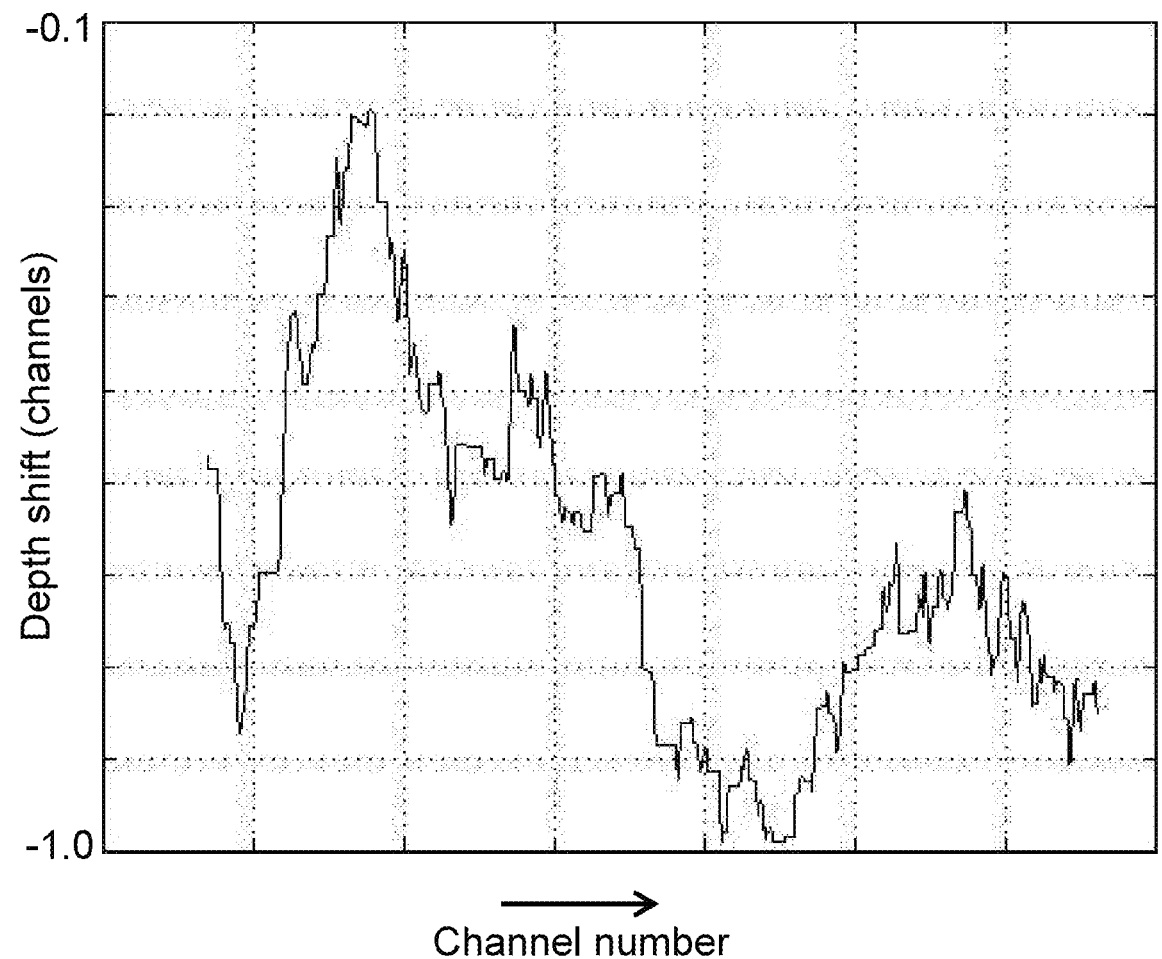

FIG. 6 shows the extracted depth-shifts for each channel in the data of FIG. 5a. FIG. 6 can be interpreted to delineate information about physical changes in the subsurface. The average depth shift in this case is −0.66 channels. The mean depth shift may simply be attributable to a different definition of the DAS receiver channel positions in the optical fiber (slight difference in calibration of the spread of receiver channels compared to "zero" depth) for the respective vintages of surveys. However, systematic variations in depth-shift from the mean depth shift are also observed, which are attributed to relative movement between the receiver channels and the subsurface earth formation. Supplemental information may have to be taken into account to interpret the depth-shifts, such as where there are cement, casing shoes, packers, or other borehole equipment that can influence mechanical constraints between (the seismic receiver channels in) the bore hole and the rock layers. FIG. 6 shows that, with proper interpretation of the data, the sensitivity of receiver-consistent scalars to the local acoustic properties of the rocks in the direct vicinity of the seismic receiver channels can be exploited for time-lapse in situ monitoring of movement of geological interfaces between layers relative to the locations of the seismic receiver channels in the borehole. Time-lapse variations in the association between seismic receiver channels and the formation layers, as indicated by the receiver-consistent scalars, can thus advantageously be used to monitor subsidence and/or integrity of well completions, when the installation of the seismic receiver channels is such that the formation layers can move past them.

Figure 5B:
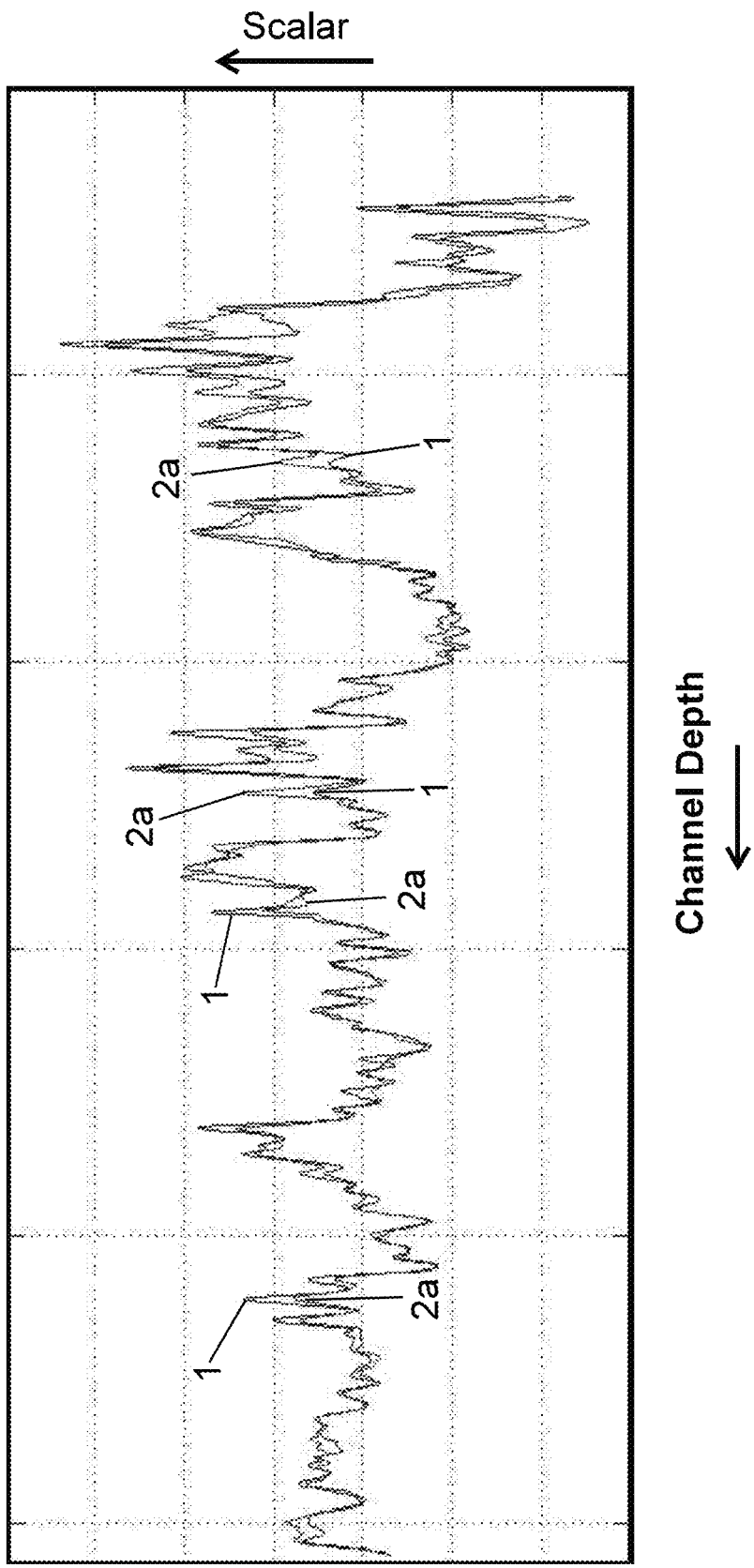
FIG. 5b shows the same data as FIG. 5a, wherein the monitor survey data has been depth-shifted to align with the base survey data.

As example, FIG. 5b shows the same data as FIG. 5a, wherein the monitor survey data has been depth-shifted by −0.66 channels (bulk-shift upwards), which corresponds to the mean depth shift established in FIG. 6. The depth-shifted monitor survey data is represented by line 2a in FIG. 5b. Bulk shift is an easy way to quickly correct for DAS recording-induced difference between the vintages, and a first step towards a qualitative insight into the changes in the scalar values for depth-aligned DAS channels. The skilled person will nonetheless understand that a quantitatively more accurate result can be obtained by applying the exact shifts as determined in FIG. 6 to each of the receiver channels.

After receiver-consistent scalars from two vintages have been aligned in depth, the differences between the base and monitoring receiver-consistent scalars can be outputted and displayed to provide time lapse changes in intra-layer formation material properties. As the measured seismic amplitudes, and thus the receiver-consistent scalar for each selected seismic receiver channel, are sensitive to the elastic properties of the formation in the direct vicinity surrounding the selected receiver channel, this sensitivity can be exploited for time-lapse monitoring of in-situ formation hardening or softening of the earth formation material around the borehole in which the seismic receiver spread is installed. An example is illustrated with help of FIG. 7, which shows the same data as FIG. 5b.

Figure 7:
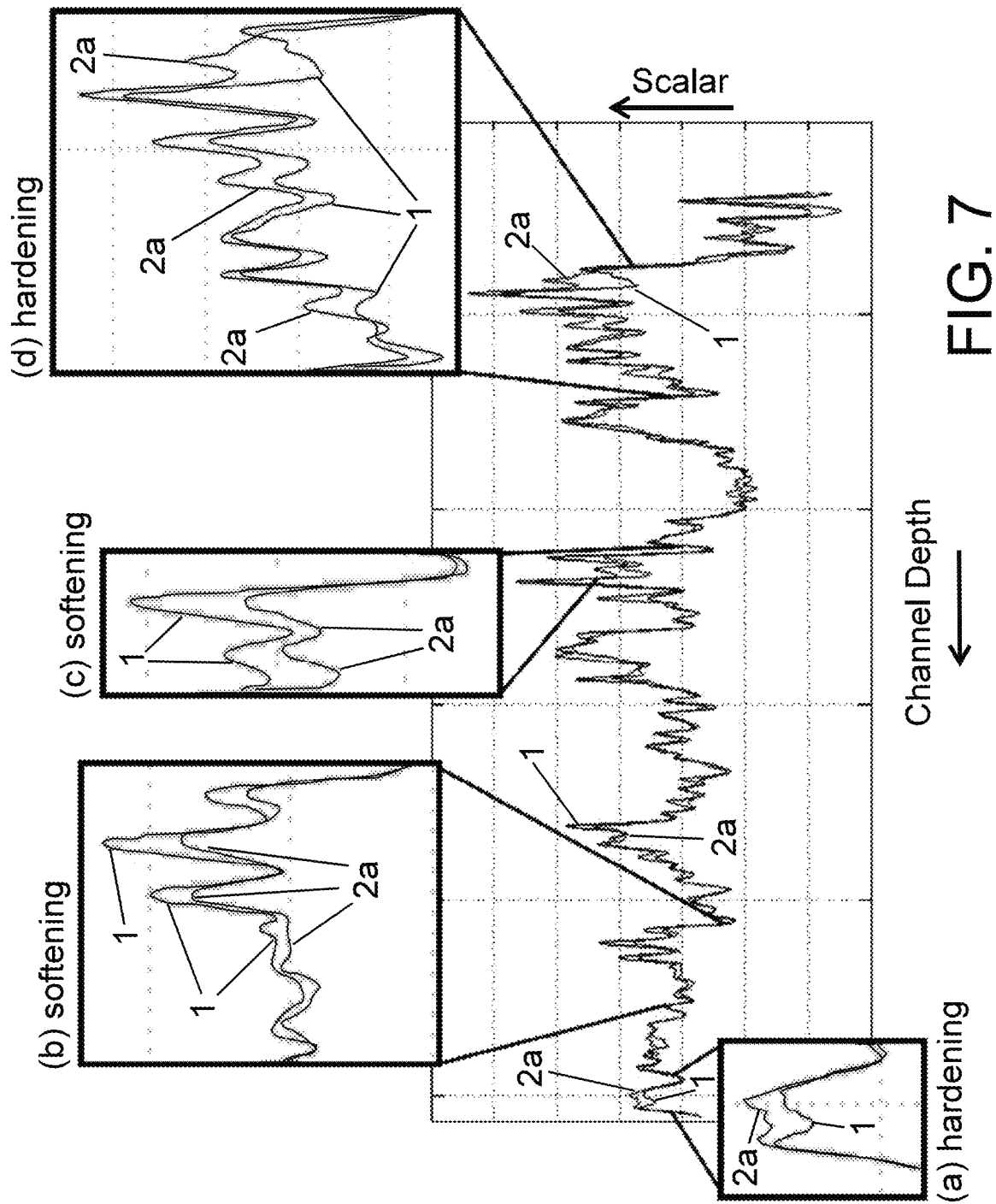
FIG. 7 shows the same data as FIG. 5b whereby small sections of the data are enlarged to highlight scalar amplitude differences in depth-aligned DAS receiver channels.

For a spread of DAS receiver channels, the corresponding receiver-consistent scalars are qualitatively proportional to the density times the square of the seismic velocity taken in the vicinity adjacent to the location where the DAS receiver channel is coupled to the earth formation. If measured in time lapse mode, the time-lapse difference between the base and monitor receiver-consistent scalars (i.e. receiver-consistent scalars of different vintages) that are associated with the same rock layer in the different vintages indicate whether the rock surrounding the borehole is hardening or softening. Increase in the receiver-consistent scalars over time is indicative of hardening, while a decrease in the receiver-consistent scalars over time is indicative of softening. The insets (a) to (d) in FIG. 7 show enlargements of small sections of the data as indicated in the figure. These insets highlight scalar amplitude differences in depth-aligned DAS receiver channels. Insets (a) and (d) emphasize depth ranges where the monitor survey scalars (line 2a) are larger than the base survey scalars (line 1), which as explained above is indicative of hardening of the associated rocks. Insets (b) and (c) emphasize other depth ranges where the monitor survey scalars (line 2a) are lower than the base survey scalars (line 1), which as explained above is indicative of softening of the associated rocks.

The insets in FIG. 7 are only intended as illustrative examples—these are not intended to exclusively identify the only depth ranges where there is evidence of hardening or softening.

The survey data discussed in the present disclosure may be or have been obtained by physically measuring seismic responses in a geographical area of interest. The geographical area of interest may comprise one or more layers of reservoir rock, capable of holding producible mineral hydrocarbons, such as oil and/or gas, or of holding fluids for storage. Examples of such fluids include natural gas that has been produced elsewhere, and captured carbon dioxide. Such layers of reservoir rock, and other layers of interest, such as layers that may be situated above the reservoir rock (the so-called "overburden layers") may be subject to changes by fluid processes in the reservoir rock. For example, reservoir depletion due to production of hydrocarbon fluids from the reservoir may result in reservoir and overburden stretch.

Based on the changes in the receiver-consistent scalars before and after the time lapse and/or the physical changes in the subsurface, a plan to influence producing of mineral hydrocarbons from a reservoir rock present in the subsurface, and/or to influence storing of fluids in the reservoir rock or retrieving previously stored fluids from the reservoir rock, may be created and executed. The plan may comprise implementing changes to fluid extraction rate, fluid injection rate, or even drilling of new wells to the reservoir rock or other reservoir rocks within the same geographical area of interest. Observed time-lapse changes in the receiver-consistent scalars may also indicate well completion changes. Accordingly, the plan may include well repair and/or design changes of future wells. Similar to other methods of time-lapse monitoring, the currently proposed method of time-lapse monitoring may thus be implemented in methods of producing mineral hydrocarbons from a reservoir rock present in the subsurface, and/or of storing of fluids in the reservoir rock and/or retrieving previously stored fluids from the reservoir rocks. Plans Of course, all the information derived from the receiver consistent scalars as described herein can be supplemented by traditional time lapse, or 4D, seismic attributes for a more confident and extensive interpretation. However, the information may also be used on its own for a relatively inexpensive local monitoring instead of full 4D seismic surveys (which are much more expensive), or for additional local monitoring in between vintages of full 4D seismic surveys.

Finally, it will have become apparent to the person skilled in the art that the comparison of scalars can be done with or without a step of depth-aligning or depth-matching, and depth-matching can be done with or without a subsequent analysis of changes in scalar magnitudes.

The person skilled in the art will understand that the present invention can be carried out in many various ways without departing from the scope of the appended claims.

The invention claimed is:

1. A method of time-lapse monitoring of a subsurface earth formation adjacent to a seismic receiver spread, comprising:
    selecting a seismic receiver spread disposed in an earth formation, wherein said seismic receiver spread comprises a plurality of seismic receiver channels, each seismic receiver channel having a seismic receiver channel location, whereby each seismic receiver channel is acoustically coupled to the earth formation that is present adjacent to the seismic receiver channel location;
    collecting base survey data, comprising measuring base survey signals in the seismic receiver spread induced by seismic waves propagating through the earth formation;
    determining base receiver-consistent scalars for at least a portion of the plurality of the seismic receiver channels from the base survey data, wherein each of the at least portion of the plurality of the seismic receiver channels is associated with one of the base receiver-consistent scalar, representing a measure of signal amplitude induced by seismic waves propagating through the earth formation adjacent to that one seismic receiver channel;
    allowing a time lapse between said collecting of base survey data and collecting of monitor survey data;
    after said time lapse, collecting the monitoring survey data, comprising measuring monitor survey signals induced by seismic waves propagating through the earth formation for the same seismic receiver channels in the seismic receiver spread that were used in the base survey;
    determining monitor receiver-consistent scalars for the seismic receiver channels from the monitor survey data;
    outputting base and monitor receiver-consistent scalars to reveal changes in the receiver-consistent scalars per individual seismic receiver channel before and after the time lapse.

2. The method of claim 1, wherein respective receiver-consistent scalars are a measure of elastic properties of the formation adjacent to the respective seismic receiver channel to which the receiver channel is locally coupled.

3. The method of claim 1, wherein said changes in the receiver-consistent scalars reflect changes of elastic properties of the formation adjacent to the respective seismic receiver channel.

4. The method of claim 1, wherein signal amplitude is determined using an average amplitude of a plurality of coherent seismic events.

5. The method of claim 1, wherein the receiver-consistent scalars are determined from multiple gathers.

6. The method of claim 5, wherein said multiple gathers are taken with mutually differing source-receiver offsets.

7. The method of claim 1, wherein each receiver-consistent scalar is a single numerical value which characterizes the response of a specific receiver as configured within its local environment coupled to the earth formation, by removing contributions or effects of other circumstances that affect a factual response.

8. The method of claim 1, wherein the receiver-consistent scalars are determined from un-inverted seismic data.

9. The method of claim 1, further comprising the step of:
using the changes in respective receiver-consistent scalars to delineate information about physical changes in the formation directly adjacent to the respective seismic receiver channel to which the receiver channel is acoustically coupled.

10. The method of claim 1, further comprising a step of depth-matching of monitor receiver-consistent scalars of one or more of the seismic receiver channels with base receiver-consistent scalars of corresponding seismic receiver channels.

11. The method of claim 10, further comprising extracting a set of depth shifts for said one or more of the seismic receiver channels between base and monitor surveys.

12. The method of claim 11, comprising outputting said set of depth shifts and delineating information about relative movement between rock layers in the subsurface earth formation and the seismic receiver channels that has occurred during the time lapse.

13. The method of claim 1, further comprising depth aligning the base receiver-consistent scalars and monitor receiver-consistent scalars, and outputting differences between base receiver-consistent scalars and monitor receiver-consistent scalars for one or more of the seismic receiver channels.

14. The method of claim 1, further comprising delineating a change in an elastic property of the earth formation that is present adjacent to the seismic receiver channel locations.

15. The method of claim 1, wherein the monitor receiver-consistent scalars for the seismic receiver channels are determined from the monitor survey data by following the same procedure that is used to determine the base receiver-consistent scalars from the base survey data.

16. The method of claim 1, wherein the time lapse is at least one full day.

17. The method of claim 1, wherein the seismic receiver channels in the seismic receiver spread form a string of seismic receiver channels.

18. The method of claim 1, wherein the seismic receiver spread is formed by a Distributed Acoustic Sensing (DAS) system which subdivides an optical fiber in a plurality of DAS receiver channels whereby the seismic receiver channels are said DAS receiver channels.

19. The method of claim 18, wherein said optical fiber is packaged in a cable and interrogated by a DAS interrogator unit.

20. The method of claim 19, where said optical fiber is sensitive to broadside seismic waves relative to said cable.

* * * * *

UNITED STATES PATENT AND TRADEMARK OFFICE
CERTIFICATE OF CORRECTION

| | |
|---|---|
| PATENT NO. | : 12,130,395 B2 |
| APPLICATION NO. | : 17/671683 |
| DATED | : October 29, 2024 |
| INVENTOR(S) | : Albena Alexandrova Mateeva et al. |

It is certified that error appears in the above-identified patent and that said Letters Patent is hereby corrected as shown below:

In the Specification

In Column 7, Line 24, delete "MID." and insert -- MD. --.

In the Claims

In Column 10, Line 38, in Claim 1, delete "least" and insert -- least a --.

Signed and Sealed this
Seventh Day of January, 2025

Derrick Brent
*Acting Director of the United States Patent and Trademark Office*